Jan. 19, 1954     H. J. RAND     2,666,447
SNAP ACTION BALL COCK
Filed April 8, 1949
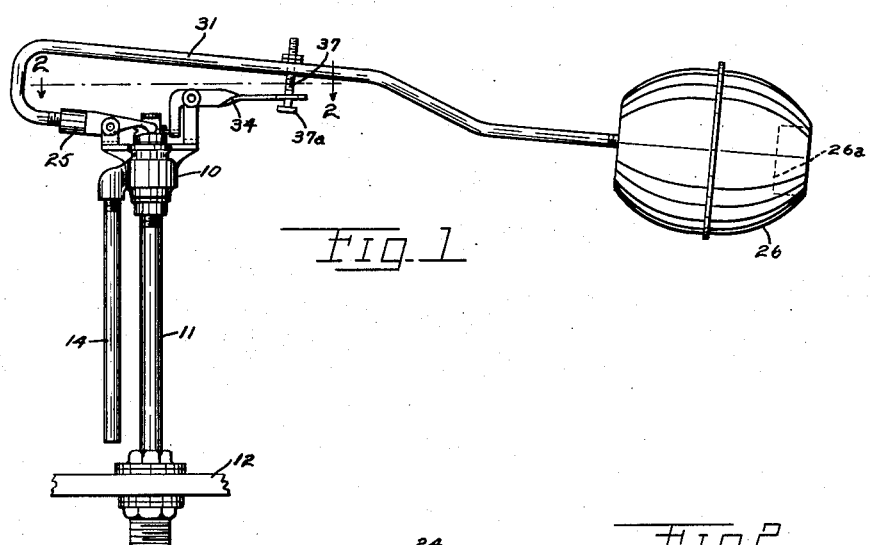
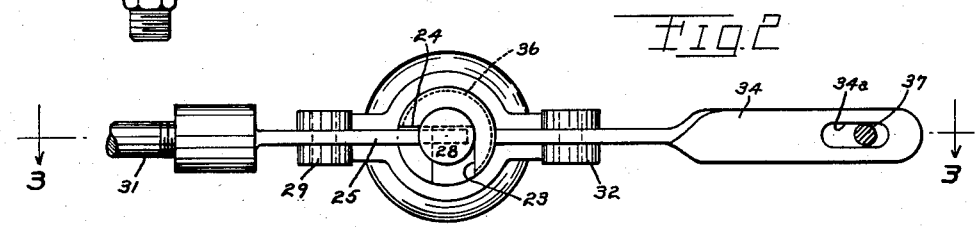
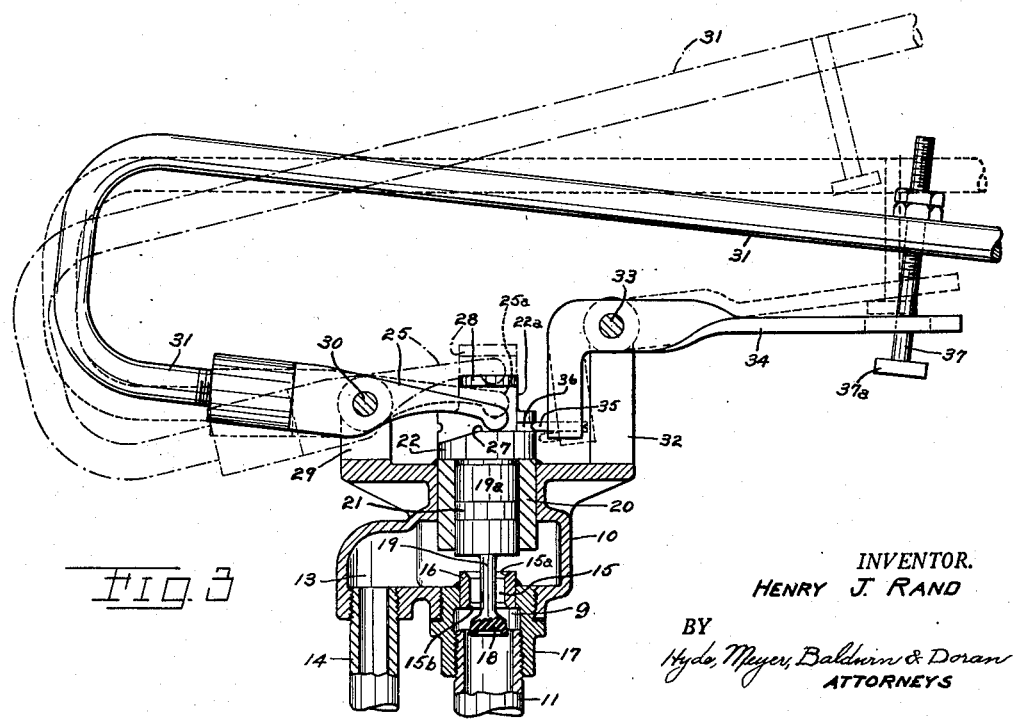
INVENTOR.
HENRY J. RAND
BY
Hyde, Meyer, Baldwin & Doran
ATTORNEYS Patented Jan. 19, 1954

2,666,447

UNITED STATES PATENT OFFICE 2,666,447

SNAP ACTION BALL COCK

Henry J. Rand, Bratenahl, Ohio, assignor to Magic Seal, Inc., Bratenahl, Ohio, a corporation of Ohio Application April 8, 1949, Serial No. 86,310

2 Claims. (Cl. 137—420)

This invention relates to improvements in a ball cock, and more particularly to one in which a detent maintains a valve in full open position until the tank is filled substantially to the desired level, at which time the detent is tripped permitting the valve to close quickly.

Another object of the present invention is to provide a ball cock of the type described wherein a trigger mechanism holds a detent in position to maintain the valve fully open and float actuated means for tripping the detent when a predetermined water level is reached.

Still another object of the present invention is to provide a ball cock of the type described wherein the flow of water into the tank normally urges the valve toward its seat but wherein the valve is positively held open until the water reaches approximately the desired level in the tank, whereupon a float permits the valve to close promptly, together with positive float actuated means for aiding in the closing of the valve in case the water pressure is not effective to do so.

Other objects and advantages of the present invention will be apparent from the accompanying drawings and description and the essential features will be set forth in the appended claims.

In the drawings,

Fig. 1 is a side elevational view of one form of my improved ball cock with only a portion of the bottom wall of the tank or reservoir being shown;

Fig. 2 is a fragmental top plan view of the same taken approximately along the line 2—2 of Fig. 1; while Fig. 3 is a sectional view taken approximately along the line 3—3 of Fig. 2.

I have chosen to illustrate my invention in connection with a valve which is more completely disclosed, described and claimed in my copending application, Serial No. 71,094, now Patent No. 2,659,566, granted November 17, 1953, to which reference may be had for further details. It is sufficient to state here that this valve is embodied in the present disclosure as incorporated in a housing 10 which is mounted at the upper end of the water inlet pipe 11 which leads through the bottom wall 12 of the tank or reservoir in the usual manner. The valve housing has an inlet 9 communicating with the line 11 and an outlet 13, which preferably is connected with a discharge pipe 14 extending downwardly in the tank. Intermediate the inlet and outlet there is a generally cylindrical bore 15 which is flared at its upper end 15a for the insertion of the plug type valve and which is flared at its lower end 15b for coaction with the valve plug in a sealing action. It will be noted that the central axis of the bore 15 extends substantially in a vertical direction. In the present instance, the bore 15 is provided in a sleeve 16 of suitable metal which is brazed or welded to a fitting 17 which has threaded engagement at its lower end with the pipe 11 and threaded engagement at its upper end with the valve housing 10. At the inlet end of the bore 15 is provided a valve plug 18. This plug is preferably formed integrally with the stem 19 which extends upwardly therefrom. The plug itself is of resilient rubber-like material whose lower end is in the form of a truncated cone, the upper diameter of which is slightly less than the diameter of bore 15 and the lower diameter of which is slightly greater than the bore 15 as taught in my above mentioned copending application. The copending application also teaches how this valve may be assembled by pushing the plug 18 downwardly through the bore 15.

Means are provided for guiding the valve 18 in its movement from open position as shown in Fig. 3 to a closed position where the plug 18 has at least partially entered into the lower portion of the bore 15. My copending application teaches how the side walls of the plug 18 produce a line contact where the flare 15b joins the bore 15 so that a complete seal is formed in a substantially frictionless manner. To guide the valve in its vertical reciprocation, I have provided a cylindrical sleeve 20 which slidingly embraces a valve stem guide 19a which, in the form shown, is made integral with the stem 19. A ring of suitable packing may be provided at the zone 21. At the upper end of the cylindrical portion 19a, an enlarged head 22 is provided. The lower portion of the head 22 is of larger diameter than the upper portion 22a. A portion of both the larger and smaller diameter portions of this head are cut away along the lines 23 and 24 of Fig. 2 to receive an actuating arm 25 which is connected in a manner later described with the float 26. This provides a platform 27 beneath the end of the actuator arm and a flange 28 above the end of the actuator arm.

A bracket 29 is formed at one side of the upper portion of the valve housing 10 and supports on a pivot 30 the actuator arm 25 which is threaded or otherwise connected with a U-shaped float arm 31, which carries at its outer end the hollow float 26 which is adapted to rest upon the water in the tank which is above the bottom wall 12, although not fully shown in the drawings. At the right-hand side of the valve housing 10 is provided an upstanding bracket 32 having a pivot 33 upon which is mounted an L-shaped arm 34 which carries at its lower inner end a detent 35. This detent is preferably threaded through the arm 34 so as to be adjustable. The free end of the detent engages in a horizontally extending groove 36 which extends somewhat more than half-way around the head 22 as clearly shown in Fig. 2. When the detent is in holding position, the arm 34 is in the position shown in Fig. 1 and in the full line position of Fig. 3. A pin 37 threaded through the float arm 31 passes through an opening 34a in the upper right-hand end of the arm 34 as shown in Figs. 1 and 3. The lower end of this pin has an enlarged head 37a adapted to engage the under side of arm 34 as the float rises, so that in the dotted position of arm 34 in Fig. 3 the float has just tripped the detent arm 34 causing the detent 35 to leave the groove 36. The play of pin 37 from the full line position of Fig. 3 to the dotted line position, when head 37a engages the lower face of arm 34, provides a lost motion connection.

It is believed that the action of my device will now be apparent. With the parts in the position of Fig. 1 and in the full line position of Fig. 3, the tank has been flushed and the float 26 has moved to its lowermost position. The valve 18 has been moved to its fully open position and the downward movement is stopped by the enlarged head 22 engaging against the sleeve 20. The actuator arm 25 has its end firmly pressed against the platform 27 and it is held in this position by the weight of the valve actuating and guiding parts and the float 26. Preferably the float is provided with an internal weight 26a to insure that it is heavy enough to hold the valve 18 closed against the upward rush of water through the pipe 11. As the water reaches the desired level or almost the desired level, the float 26 is raised slightly from the position of Fig. 1 until the parts reach the dotted line position of Fig. 3. The head 37a of the pin 37 then oscillates the arm 34 slightly in a counterclockwise direction about the pivot 33 as clearly shown in Fig. 3, causing the detent 35 to be withdrawn from the groove 36. At this moment, the head 25a of the actuator arm 25 is raised above the platform 27 to the dotted line position as clearly shown in Fig. 3. As the detent 35 is moved out of the groove 36, usually the force of the water acting beneath the valve plug 18 will cause the valve to snap upward quickly to a closed position. If the valve 18 is thus completely closed, the water ceases to flow into the tank, the float ceases to rise and the parts remain in the broken line position of Fig. 3 until the tank is again flushed. If the valve 18 is not completely closed by the action just described, the float 26 continues to rise upon the water until the arms 31 and 25 reach the dot-dash position of Fig. 3, or at least move toward that position. This causes the head 25a of the arm 25 to push upwardly on the underside of the cap 28, thus positively lifting all of the parts connected with the valve 18 toward the dot-dash position of cap 28 shown in Fig. 3. This insures positive closing of the valve 18 in case the water pressure has not done so previously.

My invention thus provides means for positively holding the valve 18 in fully open position by means of the detent 35 until the tank is filled substantially to the desired level, at which time the detent is released and the valve tends to snap shut by the force of the water flowing through it. In any case, positive means is provided for moving the valve 18 to closed position so as to insure the stoppage of the water flow at the desired tank level.

What I claim is:

1. In a ball cock, a water inlet, a valve housing connected with said inlet and having an outlet, a cylindrical valve bore in said housing communicating between said inlet and outlet, a valve seat at the inlet end of said bore, a valve in said housing on the inlet side of said seat and closing in the direction of water flow, said valve being of resilient rubber-like material of truncated cone shape having an upper diameter slightly less than the diameter of said bore and having a lower diameter slightly greater than said bore, a stem connected with said valve and having a head containing a horizontal groove, a platform and a cap on said head spaced apart vertically, an actuator arm positioned between said platform and said cap, a float operatively connected with said arm to move the latter against said platform by downward movement of said float and to move said arm against said cap by upward movement of said float, a detent having operative engagement with said groove for holding said valve fully open, and an operative connection between said float and detent for releasing the latter from said engagement with said groove, said operative connection having a lost motion connection taken up only after said float has risen almost to valve-closing position.

2. In a ball cock, a water inlet, a valve housing connected with said inlet and having an outlet, a cylindrical valve bore in said housing communicating between said inlet and outlet, a valve seat at the inlet end of said bore, a valve in said housing on the inlet side of said seat and closing in the direction of water flow, said valve being of resilient rubber-like material of truncated cone shape having an upper diameter slightly less than the diameter of said bore and having a lower diameter slightly greater than said bore, a stem connected with said valve and having a head containing a horizontal groove, a platform and a cap on said head spaced apart vertically, a float arm containing a float at one end and an actuator arm at the other end, said actuator arm positioned between said platform and said cap, said float moving the actuator arm against the platform by downward movement of the float and moving said actuator arm against said cap by upward movement of said float, an L-shaped arm pivotally mounted on said valve housing having an adjustable detent at one end, said detent having operative engagement with said groove for holding the valve fully open, the other end of said L-shaped arm being operatively connected to said float arm, said operative connection having a lost motion connection taken up only after said float has risen almost to valve closing position, thereby releasing said detent from engagement with said groove and allowing the valve to seal in said valve bore in a substantially frictionless manner.

HENRY J. RAND.

References Cited in the file of this patent

UNITED STATES PATENTS

| Number | Name | Date |
| --- | --- | --- |
| 242,502 | Blessing | June 7, 1881 |
| 841,487 | Day | Jan. 15, 1907 |
| 979,235 | Whitney | Dec. 20, 1910 |
| 1,143,000 | Voigt | June 15, 1915 |
| 1,158,743 | Swanberg | Nov. 2, 1915 |
| 1,181,716 | Allgeyer | May 2, 1916 |
| 2,013,188 | Reinhardt | Sept. 3, 1935 |
| 2,248,433 | Miller | July 8, 1941 |
| 2,308,347 | Asselin | Jan. 12, 1943 |